(12) United States Patent
Kouguchi

(10) Patent No.: US 9,940,559 B2
(45) Date of Patent: Apr. 10, 2018

(54) LABEL PRINTING CONTROL DEVICE WHICH INCLUDES A CUT MARK EXTRACTION SECTION AND AN APEX FINDING SECTION, A NON-TRANSITORY COMPUTER-READABLE STORAGE MEDIUM STORING A LABEL PRINTING CONTROL PROGRAM, AND A LABEL PRINTING CONTROL METHOD

(71) Applicant: Konica Minolta, Inc., Chiyoda-ku, Tokyo (JP)

(72) Inventor: Masatsugu Kouguchi, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/274,272

(22) Filed: Sep. 23, 2016

(65) Prior Publication Data
US 2017/0011286 A1 Jan. 12, 2017

(30) Foreign Application Priority Data
Sep. 24, 2015 (JP) .................................. 2015-186290

(51) Int. Cl.
*G06K 15/00* (2006.01)
*G06K 15/02* (2006.01)

(52) U.S. Cl.
CPC ....... *G06K 15/1868* (2013.01); *G06K 15/024* (2013.01); *G06K 15/027* (2013.01)

(58) Field of Classification Search
None
See application file for complete search history.

(56) References Cited

U.S. PATENT DOCUMENTS

| 2005/0012950 A1* | 1/2005 | Kurashina | B41J 3/4075 358/1.12 |
|---|---|---|---|
| 2012/0200885 A1* | 8/2012 | Matsuzawa | B41J 11/46 358/1.15 |

FOREIGN PATENT DOCUMENTS

JP          10-003163 A          1/1998

* cited by examiner

*Primary Examiner* — Andrew H Lam
(74) *Attorney, Agent, or Firm* — Buchanan Ingersoll & Rooney PC

(57) ABSTRACT

Provided are a label printing control device, a non-transitory computer-readable storage medium storing a label printing control program and a label printing control method. The label printing control device includes a cut mark extraction section that obtains print data including at least label images and corresponding cut marks and extracts the cut marks from the print data, and an end product image creation section that creates an end product image by removing the cut marks from the print data. The label printing control device further includes an apex finding section that finds apexes of the cut marks, an adjusting image creation section that creates an adjusting image including the cut marks with graduations added adjacent to each apex, and a print instruction section that instructs a label printing device to print the end product image and the adjusting image successively on pre-die-cut label material.

16 Claims, 14 Drawing Sheets

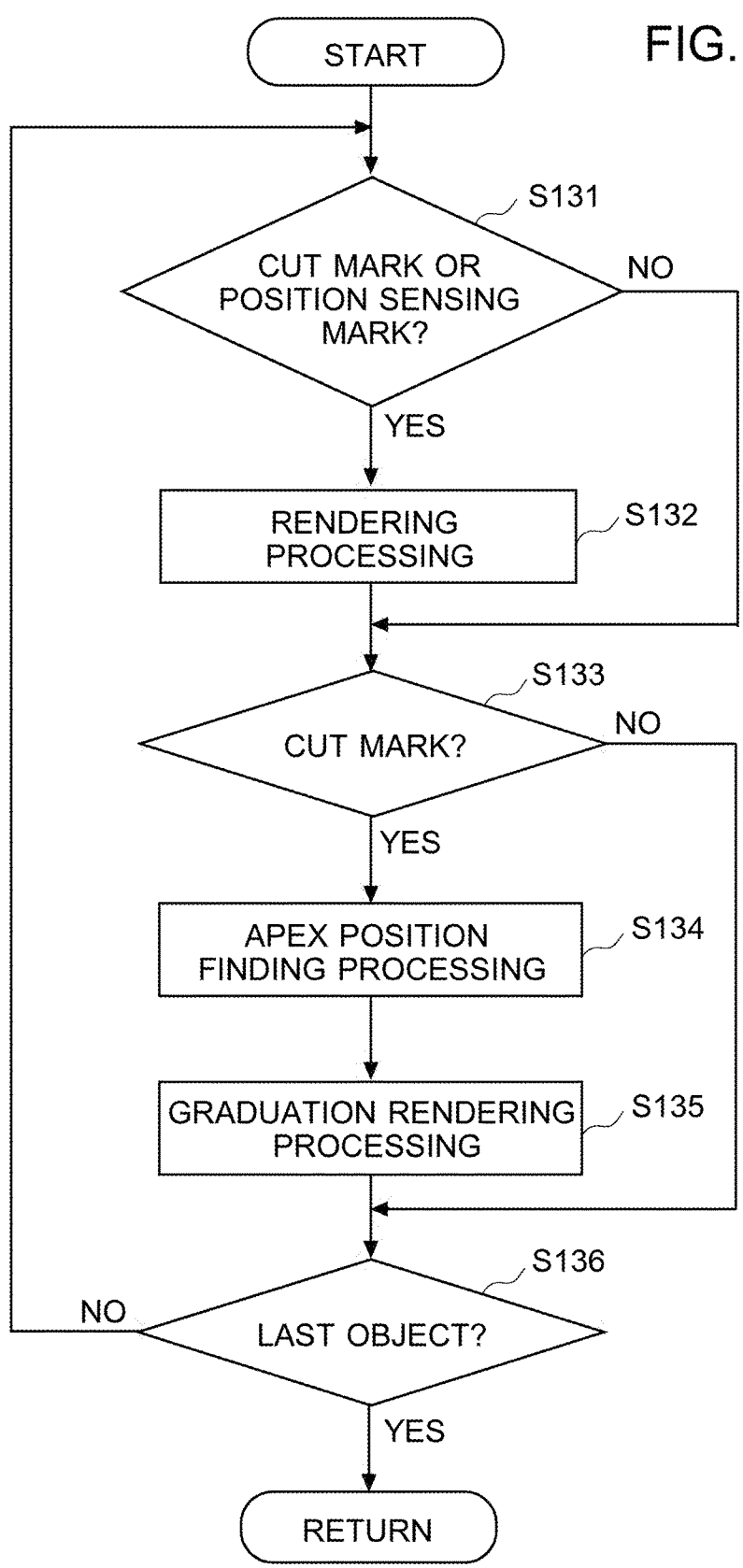

LABEL PRINTING CONTROL DEVICE WHICH INCLUDES A CUT MARK EXTRACTION SECTION AND AN APEX FINDING SECTION, A NON-TRANSITORY COMPUTER-READABLE STORAGE MEDIUM STORING A LABEL PRINTING CONTROL PROGRAM, AND A LABEL PRINTING CONTROL METHOD

The entire disclosure of Japanese Patent Application No. 2015-186290 filed on Sep. 24, 2015 including description, claims, drawings, and abstract are incorporated herein by reference in its entirety.

TECHNICAL FIELD

The present invention is directed to label printing control devices, non-transitory computer-readable storage media each storing a label printing control program, and label printing control methods. In particular, the present invention is directed to a label printing control device which realizes easy position adjustment of die cutting in label production, a non-transitory computer-readable storage medium storing a label printing control program to be executed in the label printing control device, and a label printing control method for use in a printing system including the label printing control device.

BACKGROUND

In producing a roll of labels (pressure-sensitive labels), just printing label images by a label printing device, on a face of label material provided in roll form, is not enough to obtain an end product. To provide an end product, a label printing device cooperates with a finishing machine, to cause the finishing machine to perform a process to cut the label images printed on the face of label material into label shapes (referred to as die cutting) and a process to remove waste surrounding the labels from the label material (referred to as removing waste). In order to allow a finishing machine to perform appropriate processing on the label material in the above processes, a label printing device prints eye marks, which are marks for position sensing or position sensing marks indicating the position of one or more of label images on the face of the label material, together with the label images on the face of the label material. The finishing machine performs die cutting, while sensing the position sensing marks.

DESCRIPTION OF THE RELATED ART

As an example of a technique directed to position sensing marks, which is not a technique relating to label printing, Japanese Unexamined Patent Publication (JP-A) No. H10-003163 discloses the following original printing plate with graduated corner marks. In the original printing plate, the graduated corner marks are put at the four corners on an area of a page or pages to be printed with the plate. Each of the corner marks includes graduations (scale marks) located at a top or bottom position outside the plate-making area of the page or pages to be printed with the plate, arrayed toward the center of the page from a mark indicating a trim size on an end side of the page.

By using position sensing marks printed on the face of label material, a finishing machine can determine a position of die cutting on the label material. Since finishing machines are configured to perform die cutting with a tool (die), which corresponds to a label image or a label shape and is mounted to the finishing machine, the mounted tool can be shifted from its position in the finishing machine. In view of that, in a general die-cutting process, after a finishing machine cuts a predetermined number of label images into label shapes, an operator checks the label images cut with the die visually and adjusts the position of die cutting. This adjustment is repeated until the die can cut label images at desired positions. It needs the label printing device to print more than a number of label images to be delivered to a customer. It further needs an unskilled operator to perform repeated position adjustments until the operator gets skilled at the position adjustment, because the accuracy of the position adjustment depends on the operator's skill. It can result in a problem that the label printing device prints a large number of label images which will be wasted for the position adjustment, and resources and man-hours are wastefully used for the position adjustment.

As an example of a way to make the position adjustment easy, JP-A No. H10-003163 discloses a way to print graduations arrayed from the position of a register mark toward the center of a page. In the disclosed technology, graduations are printed outside the plate-making area of page or pages to be printed with the original printing plate, and the printed graduations do not remain in a page after the edge of the page is cut off. Therefore, even if this technology is applied to a process of die cutting in label printing, it is difficult for an operator to measure the accurate shift amount of the position of die cutting on the basis of label images left after the die cutting.

SUMMARY

The present invention is directed to label printing control devices, non-transitory computer-readable storage media each storing a label printing control program and label printing control methods, which can realize easy position adjustment of die cutting and reduce the number of repeats of the position adjustment to reduce wasteful resources and man-hours for position adjustment.

A label printing control device reflecting one aspect of the present invention is a label printing control device which instructs a label printing device to print label images on label material on which the label images are to be cut into labels by a die-cutting machine. The label printing control device comprises an engine interface unit that communicably connects the label printing control device to the label printing device. The label printing control device further comprises a cut mark extraction section that obtains print data including at least label images and corresponding cut marks to be used for cutting the label images printed on label material into labels, and extracts the cut marks from the print data. The label printing control device further comprises an end product image creation section that creates an end product image by removing the cut marks from the print data. The label printing control device further comprises an apex finding section that finds apexes of the cut marks, and an adjusting image creation section that creates an adjusting image including the cut marks with graduations added adjacent to each of the apexes. The label printing control device further comprises a print instruction section that outputs image data of the end product image and the adjusting image to the label printing device and instructs the label printing device to print the end product image and the adjusting image successively on the label material, through the engine interface unit.

A non-transitory computer-readable storage medium reflecting one aspect of the present invention stores a label printing control program to be executed in a label printing control device. The printing control device instructs a label printing device to print label images on label material on which the label images are to be cut into labels by a die-cutting machine. The program, when being executed, causes a controller of the label printing control device to perform the following processing. The processing comprises obtaining print data including at least label images and corresponding cut marks to be used for cutting the label images printed on label material into labels; and extracting the cut marks from the print data. The processing further comprises creating an end product image by removing the cut marks from the print data; finding apexes of the cut marks; and creating an adjusting image by adding graduations adjacent to each of the apexes of the cut marks extracted. The processing further comprises outputting image data of the end product image and the adjusting image to the label printing device; and instructing the label printing device to print the end product image and the adjusting image successively on the label material.

A label printing control method reflecting one aspect of the present invention is a label printing control method for use in a printing system. The printing system includes a label printing device, a die-cutting machine which performs die cutting on label material on which label images were printed by the label printing device, and a label printing control device which instructs the label printing device to perform print processing on label material. The method comprises obtaining, by the label printing control device, print data including at least label images and corresponding cut marks to be used for cutting the label images printed on label material into labels; and extracting, by the label printing control device, the cut marks from the print data. The method further comprises creating, by the label printing control device, an end product image by removing the cut marks from the print data; finding apexes of the cut marks, by the label printing control device; and creating, by the label printing control device, an adjusting image by adding graduations adjacent to each of the apexes of the cut marks extracted. The method further comprises outputting, by the label printing control device, image data of the end product image and the adjusting image to the label printing device; and instructing the label printing device to print the end product image and the adjusting image successively on the label material, by the label printing control device.

Other features of illustrative embodiments will be described below.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein:

FIG. 16 is a flowchart of an example of operations (creating an adjusting image) of the printer controller according to an embodiment of the present invention.

DESCRIPTION OF THE PREFERRED EMBODIMENTS

Figure 1:
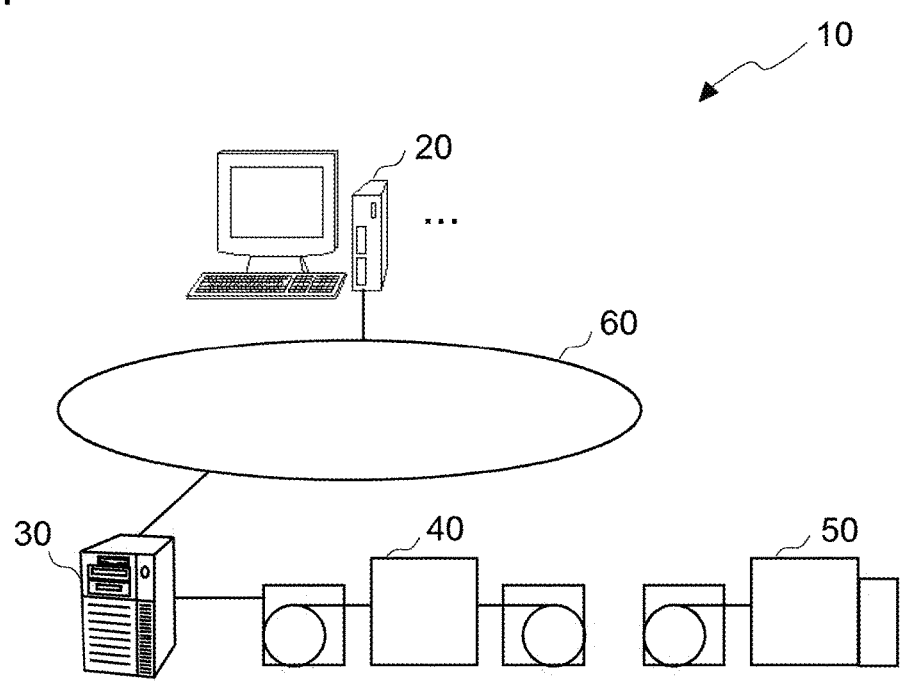
FIG. 1 is a schematic diagram of an example of the structure of a printing system according to an embodiment of the present invention.

Hereinafter, an embodiment of the present invention will be described with reference to the drawings. However, the scope of the invention is not limited to the illustrated examples.

Label printing control devices, non-transitory computer-readable storage media each storing a label printing control program and label printing control methods, as embodiments of the present invention, can realize easy position adjustment of die cutting and reduce the number of repeats of position adjustment to reduce a wasteful use of resources and man-hours for label production, for the following reason.

A label printing control device obtains print data including cut marks and then performs the following processing. The label printing control device creates, from the print data, an end product image and an adjusting image which is an image to be used for position adjustment of die cutting; and instructs a label printing device to print the end product image and the adjusting image successively on label material. The end product image is created by extracting and removing cut marks from the print data. As a concrete example, the label printing control device may create the end product image including label images and a position sensing mark. As for the adjusting image, the label printing control device finds apexes of the cut marks extracted and adds graduations adjacent to each of the apexes of the extracted cut marks, to create the adjusting image. As a concrete example, the adjusting image may include cut marks with graduations and a position sensing mark.

As described in the section of BACKGROUND, in a process of die cutting of label images into label shapes, in consideration of an occurrence of a shift of a tool (die) from its position in a finishing machine, an operator repeatedly performs position adjustment of die cutting by cutting a predetermined number of label images into label shapes, until the finishing machine can perform die cutting at desired positions. This position adjustment needs an operator's skill and needs a label printing device to print a large number of label images, which will be used for position adjustment and then disposed. It arises a problem of a wasteful use of resources and man-hours for label production.

To solve the problem, it may be considered to print graduations (scale marks) on label material as disclosed in JP-A No. H10-003163. However, in the disclosed technology, graduations are located outside the plate-making area of page or pages to be printed with the original printing plate, and the printed graduations do not remain in a page after the edge of the page is cut off. Therefore, even if this technology is applied to a process of die cutting in label production, it is difficult for an operator to get the accurate shift amount of die cutting on the basis of label images left after the die cutting.

In view of that, a label printing control device as an embodiment of the present invention is configured to perform the following processing for production of labels (such as pressure-sensitive labels). The label printing control device obtains print data including label images and corresponding cut marks to be used for cutting the label images printed on label material into labels. The label printing control device extracts cut marks from the print data, and creates an end product image by removing the cut marks from the print data. The label printing control device finds apexes of the cut marks and creates an adjusting image including the cut marks with graduations added adjacent to each of the apexes. The label printing control device then outputs image data of the end product image and the adjusting image to a label printing device and instructs the label printing device to print the end product image and the adjusting image successively on label material.

As a concrete example, from the print data obtained, the label printing control device may create an end product image which includes the label images and a position sensing mark for indicating a position of one or more of the label images on the face of label material, and further create an adjusting image which includes the extracted cut marks and a position sensing mark. The label printing control device finds apexes of the cut marks and adds graduations to the adjusting image by using the apexes as reference points (in other words, add graduations adjacent to each of the apexes of the cut marks), where the apexes may be peak points of the outline of each cut mark in the X-axis direction and the Y-axis direction perpendicular to each other on the plane including the cut marks. Then, label printing control device outputs image data for instructing a label printing device to print the adjusting image with the graduations added and the end product image successively on label material.

Accordingly, by employing graduations adjacent to each apex of cut marks, added into the adjusting image, it allows an operator to check the shift amount of the position of die cutting easily and set the amount of position adjustment of the die cutting easily. Thereby, an operator can complete the position adjustment after a small number of repeats of the position adjustment, which reduces wasteful resources and man-hours for label production. Further, when cut marks and graduations are printed in a single color of black on label material, it can furthermore reduce a consumption of toner in a label printing device, and increases visibility of the cut marks and graduations and then makes the position adjustment easier.

EXAMPLES

Figure 6:
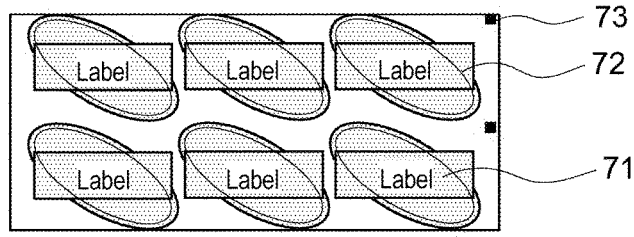
FIG. 6 is a diagram illustrating a positional relationship between label images and cut marks in print data.
Figure 7:
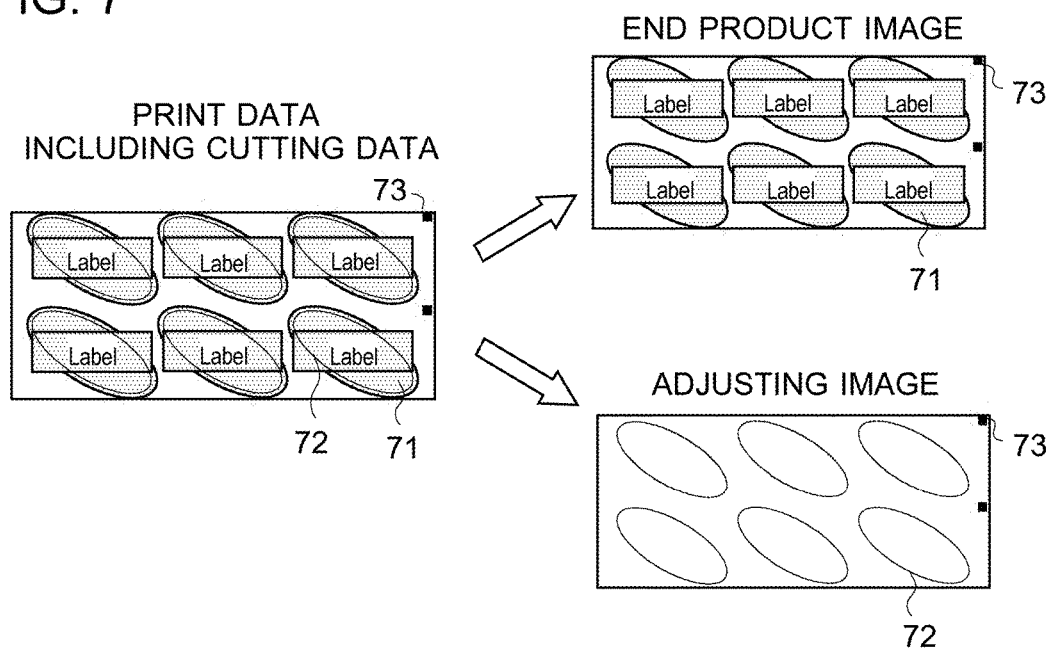
FIG. 7 is a diagram illustrating an end product image and an adjusting image both created form print data including cut marks.
Figure 8:
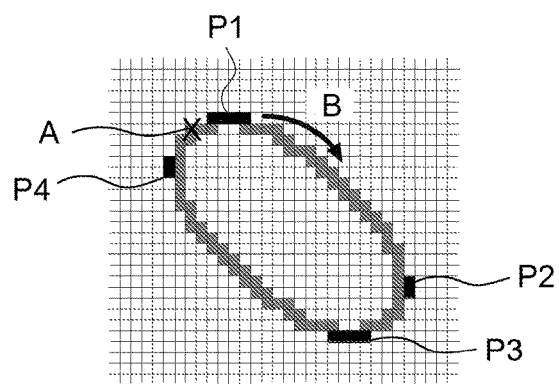
FIG. 8 is a diagram illustrating a way to find apexes of a cut mark.
Figure 10A:
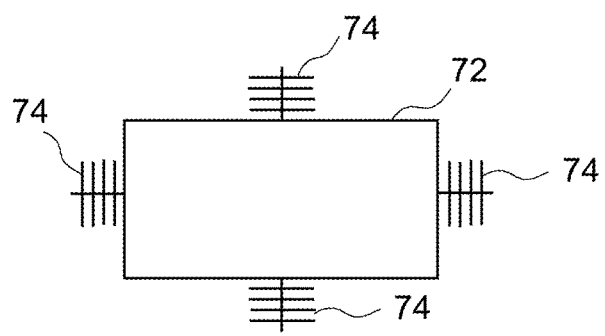
FIGS. 10A and 10B are diagrams illustrating another example of a cut mark with graduations added.
Figure 10B:
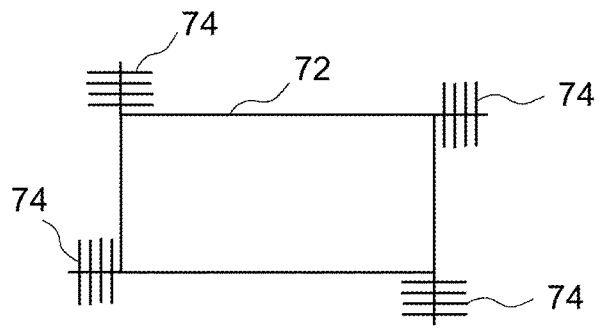
Figure 11:
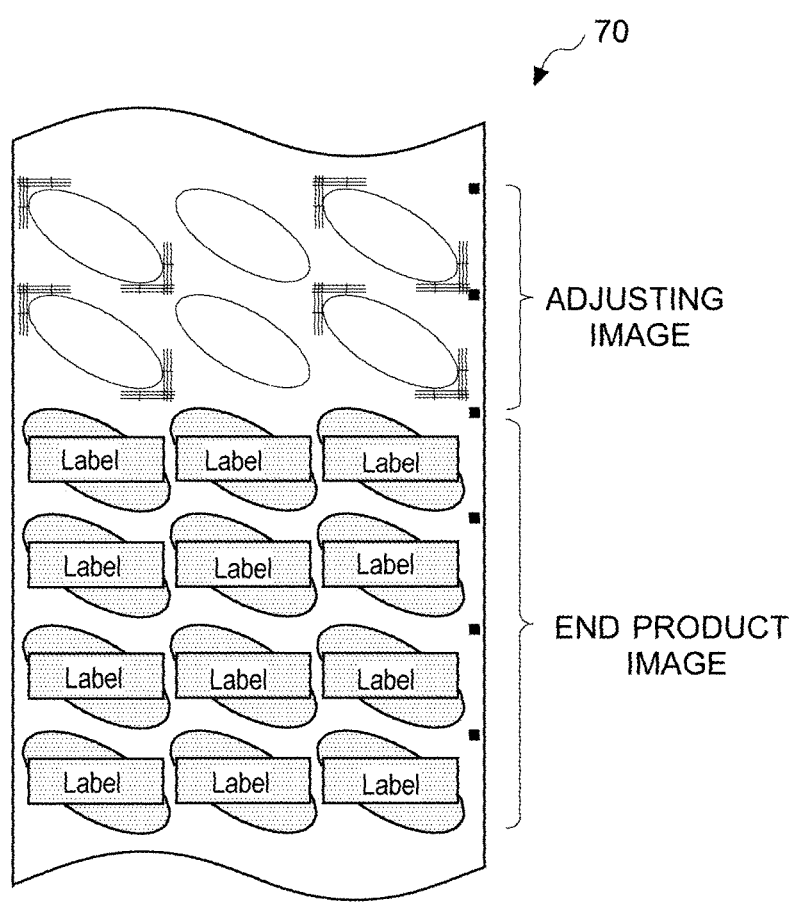
FIG. 11 is a diagram of an example of continuous label material on which an adjusting image with graduations added and an end product image were printed successively, according to an embodiment of the present invention.
Figure 14:
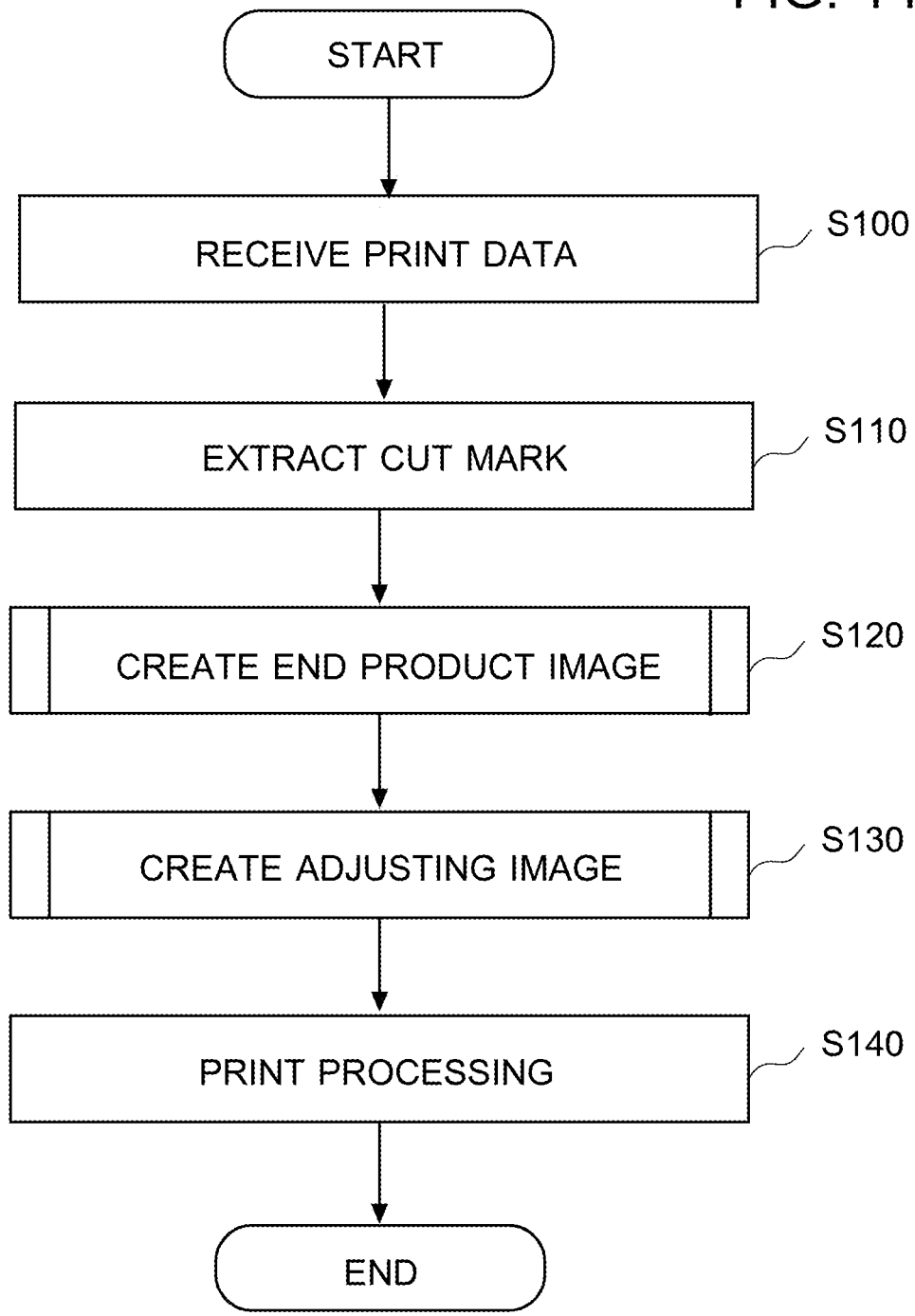
FIG. 14 is a flowchart of an example of operations (the whole processing of label printing control) of the printer controller according to an embodiment of the present invention.
Figure 15:
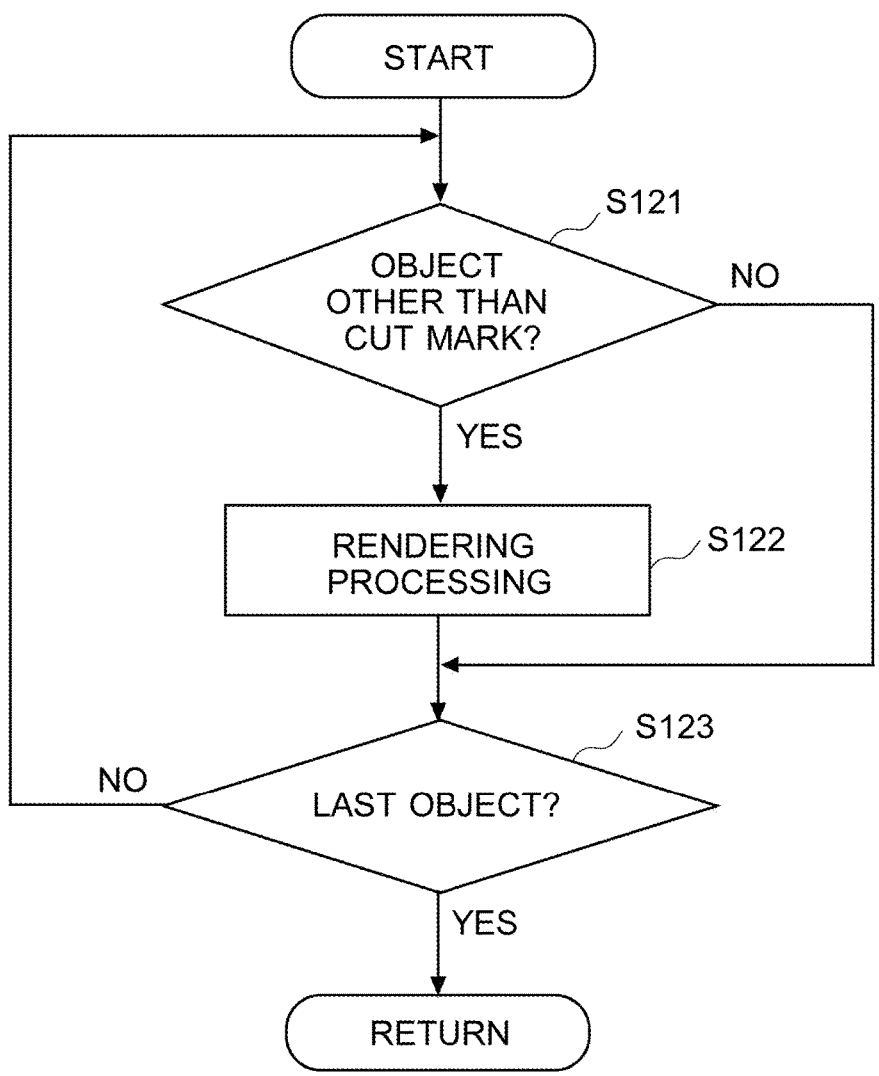
FIG. 15 is a flowchart of an example of operations (creating an end product image) of the printer controller according to an embodiment of the present invention.

In order to describe in more detail the above-mentioned embodiments of the present invention, a description will be given of an example of a label printing control device, a non-transitory computer-readable storage medium storing a label printing control program and a label printing control method according to one embodiment of the present invention, with reference to FIG. 1 to FIG. 16. FIG. 1 is a schematic diagram of the structure of a printing system of the present example. FIGS. 2A to 4B are block diagrams of the structures of a client terminal, a printer controller and a label printing control device of the printing system. FIGS. 5A to 5E are block diagrams illustrating label printing. FIG. 6 is a diagram illustrating a positional relationship between label images and cut marks in print data. FIG. 7 is a diagram illustrating an end product image and an adjusting image both created form print data including cut marks. FIG. 8 is a diagram illustrating a way to find apexes of a cut mark. FIGS. 9A to 10B are diagrams illustrating examples of a cut mark with graduations added. FIG. 11 is a diagram of an example of label material on which an adjusting image with graduations and an end product image were printed in series. FIGS. 12A to 12C and FIGS. 13A to 13C are diagrams illustrating conditions of graduations after a process of die cutting and a process of removing waste. FIGS. 14 to 16 are flowcharts of an example of operations of the printer controller of the present example.

As illustrated in FIG. 1, printing system of the present example includes at least one client terminal 20, printer controller 30, label printing device 40 and die-cutting machine 50. The client terminal 20, printer controller 30 and label printing device 40 are communicably connected to each other through a communication network, where examples of the communication network include a LAN (Local Area Network) and WAN (Wide Area Network) defined by specifications, such as Ethernet, Token Ring and FDDI (Fiber-Distributed Data Interface). Printer controller 30 and label printing device 40 may be communicably connected to each other with an exclusive line supporting, for example, PCI (Peripheral Component Interconnect) communication. Hereinafter, a description will be given of these devices.

Figure 2A:
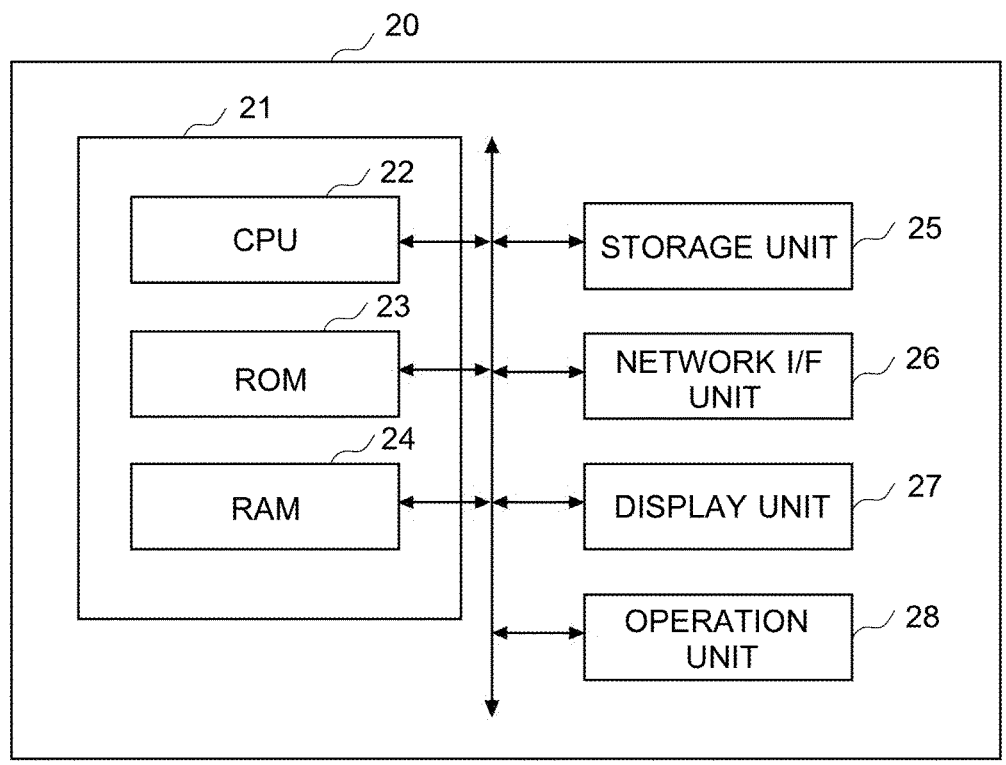
FIGS. 2A and 2B are block diagrams of an example of the structure of a client terminal according to an embodiment of the present invention.

Client Terminal:

Client terminal 20 is a computing device, for example, a personal computer, that sends print data to printer controller 30. Client terminal 20 includes, as illustrated in FIG. 2A, controller 21, storage unit 25, network interface (I/F) unit 26, display unit 27 and operation unit 28.

Figure 2B:
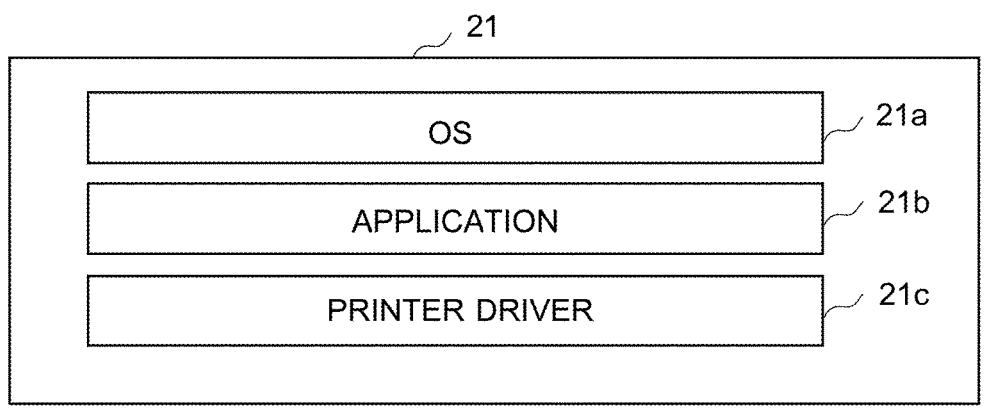

Controller 21 includes CPU (Central Processing Unit) 22, and memories including ROM (Read Only Memory) 23 and RAM (Random Access Memory) 24. CPU 22 reads out control programs stored in ROM 23 or storage unit 25, loads the programs onto RAM 24, and executes the programs, thereby performing the whole operations of client terminal 20. As illustrated in FIG. 2B, controller 21 (CPU 22) is configured to execute OS (Operating System) 21a, application 21b and printer driver 21c.

Examples of OS 21a include Windows, OS X and Android, where Windows is a registered trademark of Microsoft Corporation in the United States and/or other countries, OS X is a trademark of Apple Inc., registered in the U.S. and other countries, and Android is a trademark of Google Inc. in the United States and/or other countries. OS 21a manages application 21b and printer driver 21c in the client terminal 20 so as to function and run the programs.

Application 21b includes, for example, an application program for creating labels (for example, pressure-sensitive labels), which, on sending print instructions, invokes printer driver 21c and transfers data created by the application 21b to the printer driver 21c.

Printer driver 21c converts data created by the application 21b into print data in a language that printer controller 30 can interpret, where examples of the print data include PDL (Page Description Language) data written in page description languages, such as PJL (Printer Job Language), PS (PostScript) and PCL (Printer Control Language); and PDF (Portable Document Format) data. The print data includes, as printing images, label images, a mark for position sensing or position sensing mark (so-called, an eye mark) indicating the position of one or more of label images on the face of label material, and cut marks indicating outlines where the label images are cut into label shapes. In the print data, print setting information which defines conditions for printing the label images, the cut marks, and the position sensing mark is added to the printing images. In order to allow an operator to realize an easy adjustment of the positions of cut marks relative to corresponding label images on a screen of client terminal 20, the cut marks in the print data are, in general, set in a specific color (a spot color) which has been specified by a user in advance.

Storage unit 25 includes a HDD (Hard Disk Drive) and/or a SSD (Solid State Drive). Storage unit 25 stores programs which, when being executed, cause the CPU 22 to control various sections of the client terminal 20; print data; and others.

Network interface unit 26 includes a NIC (Network Interface Card) and/or a modem. The network interface unit 26 communicably connects the client terminals 20 to communication network 60 to send print data to printer controller 30.

Display unit 27 includes a display, for example, a LCD (Liquid Crystal Display) or an organic EL (Electro-Luminescence) display, so as to display a label creation screen of application 21b, a print setup screen of printer driver 21c and other screens.

Operation unit 28 includes a device, for example, a mouse and/or a keyboard, and allows an operator to perform various operations for creating labels and adjusting positions of cut marks by using the application 21b and for setting print conditions by using the printer driver 21c.

Figure 3A:
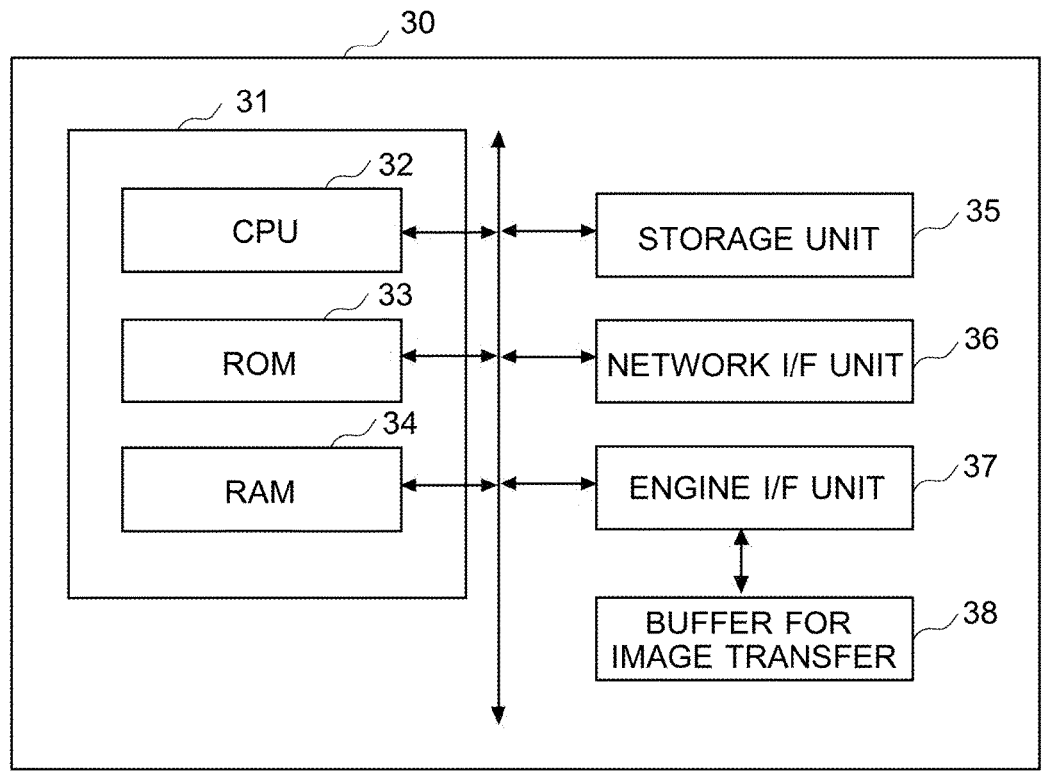
FIGS. 3A and 3B are block diagrams of an example of the structure of a printer controller according to an embodiment of the present invention.

Printer Controller:

Printer controller is a label printing control device configured to perform image processing, which includes rasterization and color conversion, on print data received from client terminal 20, and instruct label printing device 40 to perform print processing by transferring the processed image data to label printing device 40. The printer controller 30 includes, as illustrated in FIG. 3A, controller 31, storage unit 35 and network interface (I/F) unit 36, engine interface (I/F) unit 37, and buffer for image transfer 38.

Figure 3B:
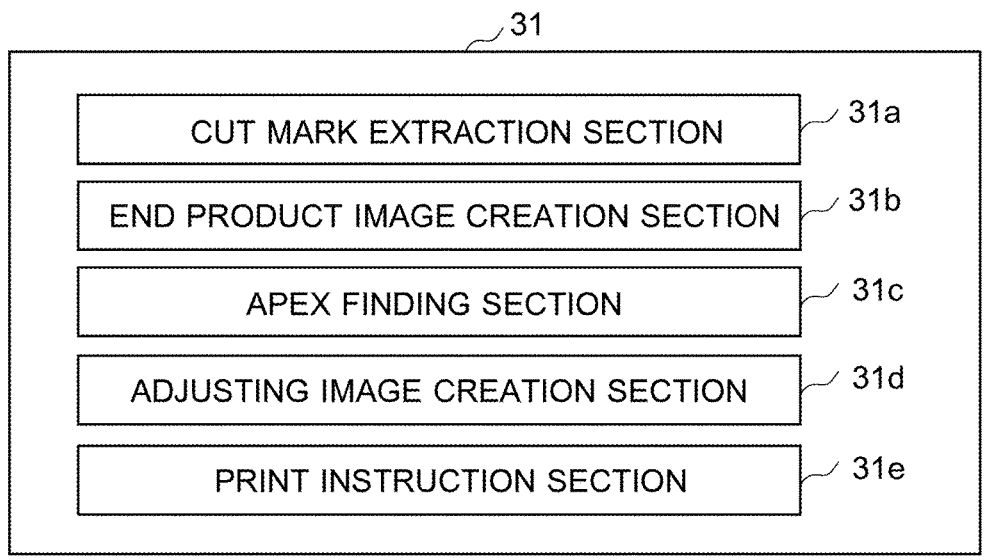

Controller 31 includes CPU 32, and memories including ROM 33 and RAM 34. CPU 32 reads out control programs stored in ROM 33 or storage unit 35, loads the programs onto RAM 34, and executes the programs, thereby performing the whole operations of the printer controller 30. As illustrated in FIG. 3B, the controller 31 (CPU 32) is configured to work as cut mark extraction section 31a, end product image creation section 31b, apex finding section 31c, adjusting image creation section 31d and print instruction section 31e.

Cut mark extraction section 31a obtains print data from client terminal 20 to analyze the print data, and extracts, from images contained in the print data, cut marks to be used for cutting label images into label shapes. In concrete terms, cut mark extraction section 31a extracts the cut marks as follows. The print data includes an array of label images, corresponding cut marks and a position sensing mark, where the cut marks are set in a spot color in the print data, in general. Therefore, cut mark extraction section 31a can extract the cut marks, by finding objects in a spot color among images contained in the print data by using, for example, tag bits.

End product image creation section 31b creates an end product image prepared by removing images of the cut marks, which were extracted by cut mark extraction section 31a, from images contained in the print data, in other words, creates an end product image including label images and a position sensing mark.

Apex finding section 31c finds the coordinates of apexes of the cut marks extracted by cut mark extraction section 31a by using the X axis (a first coordinate axis) and the Y axis (a second coordinate axis perpendicular to the first coordinate axis in the plane including the cut marks). In concrete terms, apex finding section 31c compares the coordinates of points on each cut mark with each other and finds the coordinates of four apexes including a point having the maximum X-coordinate, a point having the minimum X-coordinate, a point having the maximum Y-coordinate and a point having the minimum Y-coordinate among points on the cut mark. If the cut marks have a rectangular shape, the four apexes can be the middle points of the four sides or the four corner points of the rectangle.

Adjusting image creation section 31d adds scale marks or graduations to the cut marks extracted by cut mark extraction section 31a, where the scale marks or graduations are spaced at predetermined intervals, and are adjacent to each apex of the cut marks (preferably, on the outside of each of the cut marks). Adjusting image creation section 31d further adds a position sensing mark to the resulting image, and then creates an adjusting image. In general, an image of a position sensing mark is created in a single color of black. In this process, also images of the cut marks and graduations are created in a single color of black, to create the adjusting image. It can reduce a consumption of toner in label printing device 40 and increase visibility of the cut marks and graduations printed on label material.

Print instructions section 31e instructs label printing device 40 to perform print processing by storing image data of the end product image created by end product image creation section 31b, and image data of the adjusting image created by adjusting image creation section 31d, into buffer for image transfer 38. In printing system 10 which employs die-cutting machine 40 configured to perform die cutting on label material in order of print processing on the label material in label printing device 40, print instruction section 31e instructs label printing device 40 (in other words, stores the image data into the buffer for image transfer 38) so as to print the adjusting image before the end product image. In printing system 10 which employs die-cutting machine 40 configured to perform die cutting on label material in reverse order of print processing on the label material in label printing device 40, print instruction section 31e instructs label printing device 40 (in other words, stores the image data into the buffer for image transfer 38) so as to print the adjusting image after the end product image.

Herein, the above-mentioned cut mark extraction section 31a, end product image creation section 31b, apex finding section 31c, adjusting image creation section 31d and print instruction section 31e may be constituted as hardware devices. Alternatively, the above-mentioned cut mark extraction section 31a, end product image creation section 31b, apex finding section 31c, adjusting image creation section 31d and print instruction section 31e may be provided by a label printing control program which causes the controller 31 to function as these sections when being executed by CPU 32. That is, the controller 31 may be configured to serve as the cut mark extraction section 31a, end product image creation section 31b, apex finding section 31c, adjusting image creation section 31d and print instruction section 31e, when CPU 32 executes the label printing control program.

Storage unit 35 includes a HDD and/or a SSD. Storage unit 35 stores programs which, when being executed, cause the CPU 32 to control various sections of the device; print data received from client terminal 20; image data of an end product image and an adjusting image; and others.

Network interface unit 36 includes a NIC and/or a modem. The network interface unit 36 communicably connects the printer controller 30 to communication network 60, to receive print data from client terminal 20.

Engine interface unit 37 includes a NIC and/or a modem. The engine interface unit 37 communicably connects the printer controller 30 to label printing device 40, to send image data of the end product image and image data of the adjusting image to the label printing device 40 so as to cause the label printing device 40 to print the end product image and the adjusting image successively on label material. Buffer for image transfer 38 is connected with the engine interface unit 37. Buffer for image transfer 38 is a buffer for temporally storing image data so as to transfer images to label printing device 40.

Figure 4A:
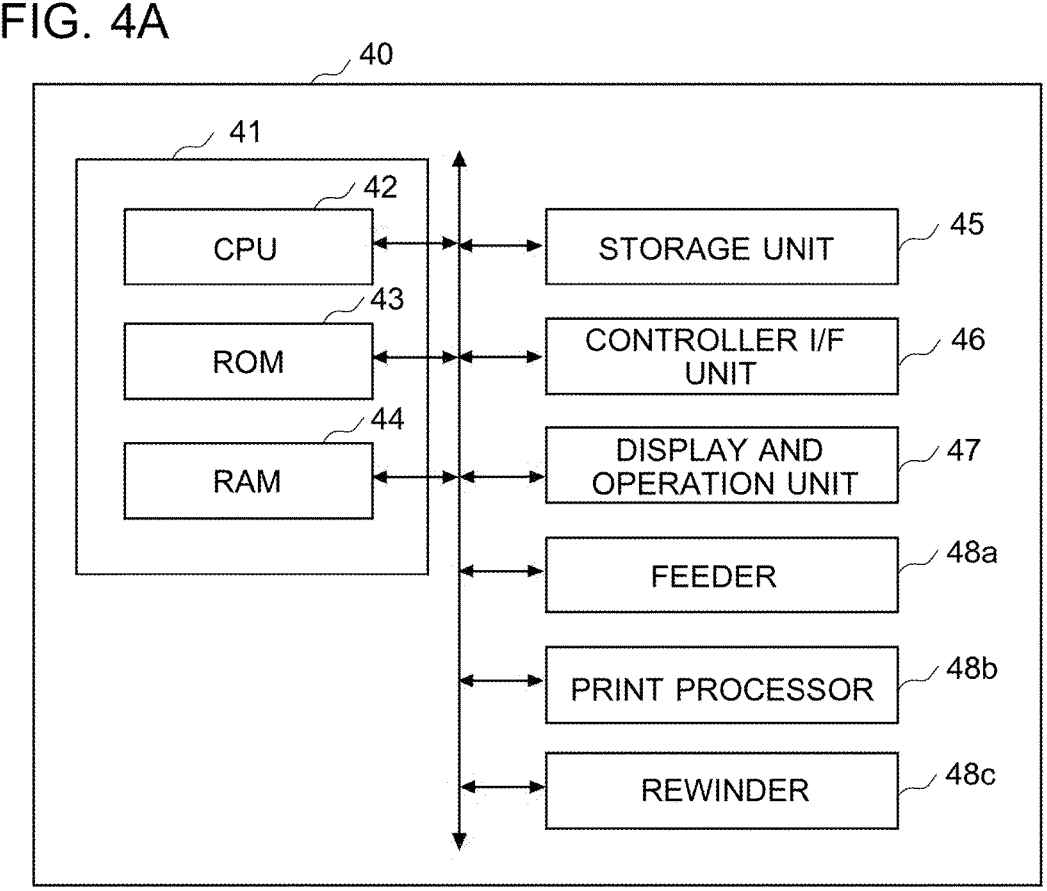
FIGS. 4A and 4B are block diagrams of an example of the structure of a label printing device according to an embodiment of the present invention.

Label Printing Device:

Label printing device 40 is a printing device to perform label printing by using a roll of label material, on the basis of image data of the end product image and image data of an adjusting image sent from printer controller 30. As illustrated in FIG. 4A, label printing device 40 includes controller 41, storage unit 45, controller interface (I/F) unit 46, display and operation unit 47, feeder 48a, print processor 48b and rewinder 48c.

Controller 41 includes CPU 42, and memories including ROM 43 and RAM 44. CPU 42 reads out control programs stored in ROM 43 or storage unit 45, loads the programs onto RAM 44, and executes the programs, thereby performing the whole operations of label printing device 40.

Storage unit 45 includes a HDD and/or a SSD. Storage unit 45 stores programs which, when being executed, cause the CPU 42 to control various sections of the label printing device 40; information about processing and functions of the label printing device 40; image data of an end product image and an adjusting image; and others.

Controller interface unit 46 includes a NIC and/or a modem. The controller interface unit 46 communicably connects the label printing device 40 to printer controller 30 so as to receive image data of an end product image and image data of an adjusting image from printer controller 30.

Display and operation unit 47 is configured to display various screens relating to print processing and allows an operator to perform various operations relating to printing on the screens. Examples of the display and operation unit 47 include a touch screen in which a pressure-sensitive operation unit (a touch sensor) composed of lattice-shaped transparent electrodes is arranged on a display unit.

Figure 4B:
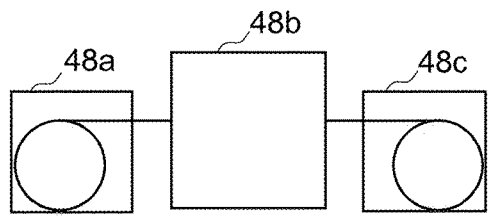

Feeder 48a is a component for feeding continuous label material provided in a roll form to print processor 48b as illustrated in FIG. 4B.

Print processor 48b prints an end product image and an adjusting image successively on continuous label material fed by feeder 48a as illustrated in FIG. 4B. The print processor 48b includes, for example, an exposure unit, an image forming unit, an intermediate transfer belt, a secondary transfer roller and a fixing unit. The exposure unit is configured to irradiate a photoreceptor drum with a laser beam in accordance with image data, to perform exposure processing. The image forming unit includes photoreceptor drums, developing units, charging units, photoreceptor cleaning units, and primary transfer rollers, and is configured to form a toner image in each color of C, M, Y, and K. The intermediate transfer belt is rotated by rollers and functions as an intermediate transfer body to convey toner images formed by the image forming unit to continuous printing medium provided in a roll form. The secondary transfer roller transfers toner images formed on the intermediate transfer belt onto the continuous label medium. The fixing unit fixes toner images transferred onto the continuous label medium.

Rewinder 48c winds label material on which print processor 48b performed print processing, into a roll, as illustrated in FIG. 4B.

Die-Cutting Machine:

Die-cutting machine 50 is a machine which cuts label images along cut marks or die lines into labels. Die-cutting machine 50 includes a feeder for feeding a roll of label material on which label printing device 40 performed print processing; a die cutting unit that performs die cutting on label material; a waste removing unit that removes waste or waste face material surrounding labels, from the label material on which die cutting was performed.

It should be noted that FIGS. 1 to 4B show printing system 10 of the present example for illustrative purpose only, and the structure and control of each given device can be modified appropriately as far as the modified devices can realize the label printing control of the present example. For example, printing system 10 illustrated in FIG. 1 includes printer controller 30 and label printing device 40 as separated devices, but the printing system 10 may alternatively include label printing device 40 with built-in printer controller 30. Further, printing system 10 illustrated in FIG. 1 includes label printing device 40 and die-cutting machine 50 as separated bodies, but alternatively the label printing device 40 and die-cutting machine 50 may be integrated into one body. If the integrated devices are configured to convey label material on which print processor 48b performed print processing, directly to die-cutting machine 50, rewinder 48c of label printing device 40 may be omitted.

Next, a description is given of general label printing with reference to FIGS. 5A to 5E.

Figure 5A:
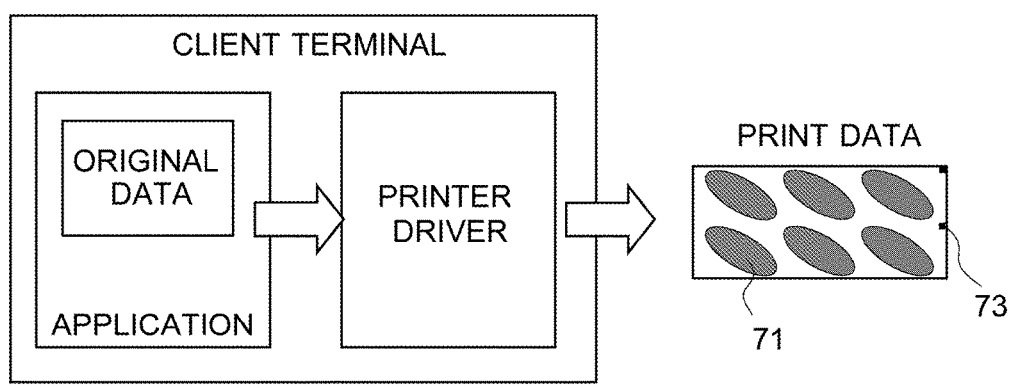
FIGS. 5A to 5E are block diagrams illustrating label printing.

First, after an operator creates data of labels (original data) by using application in a client terminal, printer driver creates print data including label images 71 and position sensing marks 73 and then outputs the print data to a printer controller (see FIG. 5A).

Figure 5B:
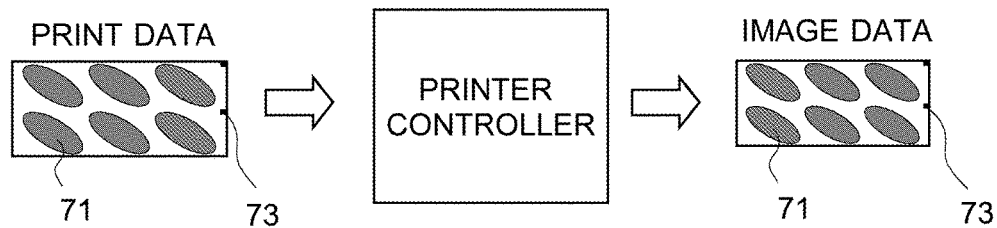

The printer controller rasterizes the print data, and then creates image data including label images 71 and position sensing marks 73, to send the image data to label printing device (see FIG. 5B).

Figure 5C:
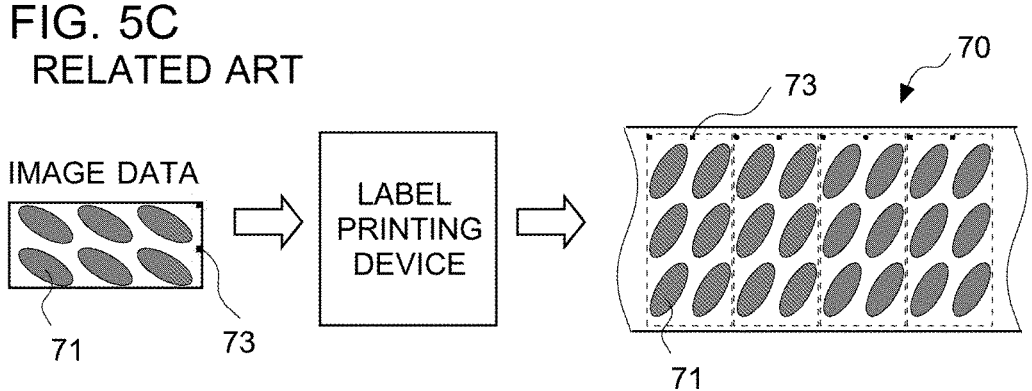

A feeder, print processor and rewinder of the label printing device use rolled label material 70 and print an array of a specified number of label images 71 and position sensing marks 73 on label material 70 (see FIG. 5C).

Figure 5D:
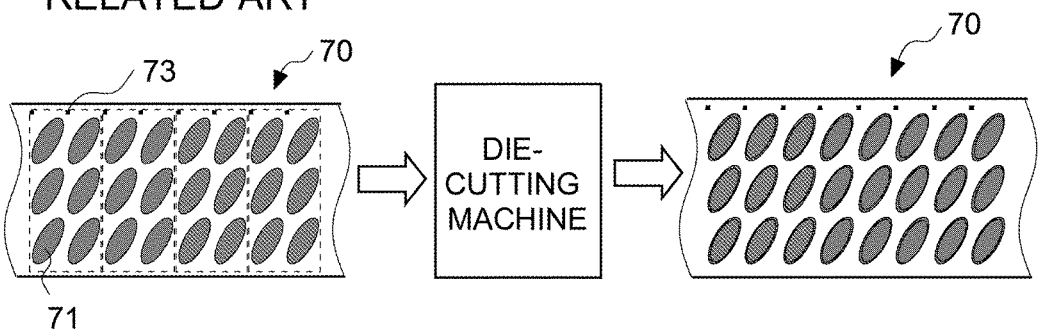
Figure 5E:
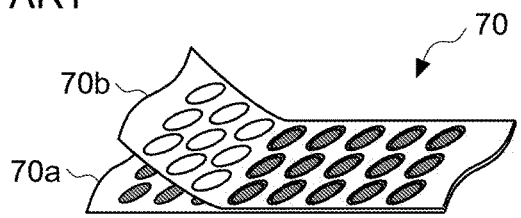

On setting the printed label material to a die-cutting machine, a die cutting unit of the die-cutting machine adjusts positions of die cutting by using position sensing marks 73 and then die cuts label images 71 into label shapes (see FIG. 5D). A waste removing unit of the die-cutting machine removes a part of face material (waste 70b) surrounding the label images or die-cut labels to separate the waste 70b from labels 70a on a release liner (see FIG. 5E).

As described above, the die cutting unit of die-cutting machine adjusts positions of die cutting by using position sensing marks 73, but a position error can occur in die cutting, depending on mounting accuracy of a tool (die) to be used for cutting label images 71 into label shapes, or other factors. In view of that, a conventional label production employed processes to cut a specific number of label images by a die-cutting machine, check a shift of the position of die cutting visually by an operator, and adjust the positions of the die cutting by the operator; and the processes were repeated until the die cutting can be done without a shift of the position of die cutting. It resulted in a problem about wasteful consumption of consumables, such as label material and toner, and wasteful use of man-hours of an operator.

In view of the problem, printing system of the present example employs a process to print cut marks indicating positions or lines on which label images are cut in label shapes, in a separated area from the area of label images on label material. Further, graduations (scale marks) for determining shift of the positions of die cutting from the cut marks, are added to an area adjacent to each of apexes of the cut marks. The printer controller of the present example controls the label printing device to print an adjusting image including the cut marks, graduations and position sensing marks, in an area on the label material where die cutting will be performed before an end product image. A detailed description of the process is given below.

First, a description is given of print data to be used for label printing, with reference to FIG. 6. In label printing, label images 71 created by a customer or a designer are arrayed according to the size of label material to be used for the label printing and/or specifications about image size that label printing device 40 can handle. The print data includes information of the arrangement of label images 71 and corresponding cut marks 72, and optionally of position sensing mark 73, which are arranged according to the size of label material to be used for the label printing and/or specifications about image size that label printing device 40 can handle. FIG. 6 illustrates print data including an array of label images arranged to fit the width of the label material. In the print data, cut marks 72 for cutting the label images 71 into label shapes, are arranged on or around the respective label images 71. In general label printing, cut marks 72 are created in a spot color, so as to be used by an operator to check the cut marks 72 on the screen of the display unit 27 of client terminal 20 and not to be printed in label printing. In an edge part of an area of label images 71 in the print data, position sensing marks (eye marks) 73 are arranged according to the specifications of die-cutting machine 50, where the position sensing marks (eye marks) 73 is used as the basis of position adjustment of die cutting to be performed in die-cutting machine 50. The position sensing mark (eye mark) 73 generally has a shape of black rectangle with sides within one centimeter.

In general label printing, printer controller 30 obtains image data prepared by removing data of cut marks 72 (referred to as cutting data) from print data created by client terminal 20, and sends the image data to label printing device 40 to instruct the label printing device 40 to perform print processing. The cutting data is generally used for creating a die to be used just for die cutting, but label printing of the present example uses print data including the cutting data (including cut marks 72).

FIG. 7 illustrates image data created from the print data including the cutting data. When receiving the print data including cutting data, printer controller 30 creates two kinds of image data: an end product image and an adjusting image, on the basis of the print data. The end product image is an image prepared by removing cut marks 72 from images contained in the print data, in other words, is an image including label images 71 and position sensing marks (eye marks) 73. The adjusting image is an image including position sensing marks (eye marks) 73 and cut marks 72, and images of graduations (scale marks) adjacent to each apex of cut marks 72 are added in the process which will be described below. In FIG. 7, cut marks 72 are objects set in a spot color, and position sensing marks (eye marks) 73 are graphic objects created in color of K=100% in rectangular shape with sides within 10 millimeters.

Next, a description is given of steps for creating an adjusting image. Printer controller 30 creates an image including only position sensing marks (eye marks) 73 and cut marks 72 from the print data. In concrete terms, from the print data, printer controller 30 extracts objects for which a spot color is set, and determines the objects as cut marks 72. From the print data, printer controller 30 further extracts graphic objects created in color of K=100% in rectangular shape with sides within 10 millimeters, and determines the objects as position sensing marks (eye marks) 73.

Since the spot color name set for cut marks 72 depends on user's environment, printer controller 30 may obtain the spot color name of cut marks 72 specified by using printer driver 21c, and process the objects to which the obtained spot color is set, as cut marks 72. A use of the adjusting image in the label printing provides the following effects. Even when a shift of the position of die cutting occurs, the position of die cutting can be easily adjusted on the basis of the positions of cut marks 72, since the cut marks 72 have the same shape as that of a die for use in die cutting. Further, since cut marks 72 are constituted by just lines, the amount of consumption of toner in printing cut marks 72 can be reduced in comparison with that in printing label images 71.

Next, a description is given of graduations (scale marks) to be added to cut marks 72. FIG. 8 is a drawing illustrating a way to find the positions of apexes of cut mark 72. The position of an apex or the apex position of a cut mark is defined by a point on the cut mark, having one of the maximum X-coordinate, the minimum X-coordinate, the maximum Y-coordinate and the minimum Y-coordinate among points located on the cut mark. The shape of cut mark 72 is defined for use in die cutting, and the outline of the mark has a shape of closed loop (closed curve). Therefore, a check of the coordinates of the points on the outline of the mark, which starts at an arbitral start point and goes along the outline, naturally reaches the start point again. Printer controller 30 can find the points of apexes of the cut mark by defining a start point on the outline of the cut mark and checking or sweeping the coordinates of the points along the outline from the start point. For example, printer controller 30 defines point A in FIG. 8 as the start point, checks or sweeps the coordinates of the points along the outline in the direction of arrow B in FIG. 8, and finds the points (P1 to P4 in FIG. 8) having the maximum X-coordinate, the maximum Y-coordinate, the minimum X-coordinate, the minimum Y-coordinate, respectively. In the example of FIG. 8, printer controller 30 finds the coordinates of four points as the apexes. Alternatively, printer controller 30 may find the coordinates of just two points having the maximum X-coordinate and the maximum Y-coordinate, respectively; or the coordinates of just two points having the minimum X-coordinate and the minimum Y-coordinate, respectively.

Figure 9A:
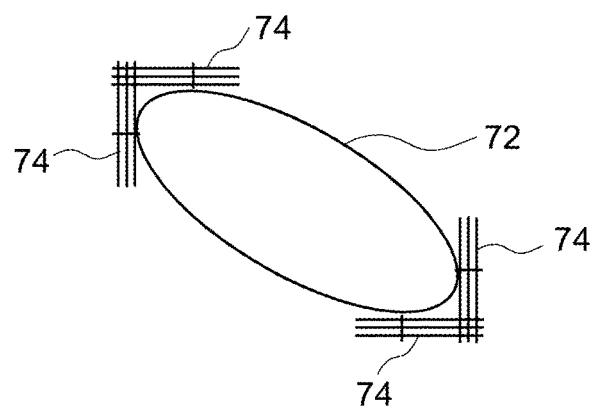
FIGS. 9A and 9B are diagrams illustrating an example of a cut mark with graduations added.
Figure 9B:
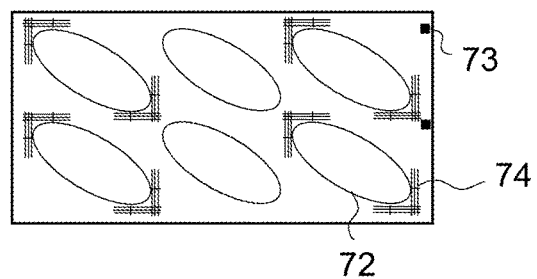

FIG. 9A illustrates an example of an image of cut mark 72 with graduations 74 added by using the positions of the apexes as reference points. FIG. 9B illustrates an example of an adjusting image after graduations are added to each of cut marks. Printer controller 30 renders, on the basis of the position of each of apexes, graduations 74 spaced at predetermined intervals so as to be arrayed toward outside the cut mark 72. The graduations 74 may be spaced at fixed intervals of, for example, 0.1 millimeters, or printer controller 30 may obtain variable values which are input through printer driver 21 as the intervals of the graduations 74.

In the above-described example, graduations 74 are added at four points having the maximum X-coordinate, the maximum Y-coordinate, the minimum X-coordinate, the minimum Y-coordinate, respectively, for cut marks 72 in oval shape. It should be noted that the shape of cut mark 72 may be defined to arbitral shape according to label image 71, and that the arrangement, construction and the number of graduations 74 may be modified arbitrarily according to the shape of cut mark 72. For example, for cut mark 72 having a shape such that the coordinates of apexes are located in a line extending in the X-axis direction or the Y-axis direction, like a rectangle, graduations 74 may be arranged by using the middle point of each side of the shape as reference points, as illustrated in FIG. 10A, or may be arranged by using each corner of the shape as reference points, as illustrated in FIG. 10B.

FIG. 11 illustrates an example of label material 70 on which an adjusting image with graduations 74 added to cut marks 72 according to the above steps, and an end product image were printed successively. In this example, only two rows (where lines extending the cross-direction or the width direction of label material 70 are assumed as rows) of cut marks 72 are printed on label material 70 for illustration purpose, but label printing device 40, in actual label printing, may print rows of cut marks 72 arrayed in a specific length in the machine direction which can provide a sufficient number of cut marks 72 needed for the position adjustment (for example, in several meters). There is no need to add graduations 74 to all the cut marks 72, and graduations 74 may be added to only the rightmost column (where lines extending the machine direction or the lengthwise direction of label material 70 are assumed as columns) of cut marks 72 or to only alternate columns of cut marks 72. In the case that the position of die cutting shifts in one of the machine direction or the direction in which label material 70 is conveyed (the vertical direction of FIG. 11) and the cross-direction or the width direction of label material 70 (the horizontal direction of FIG. 11), it is enough that graduations 74 are added to at least one position in each row, because an operator can check the shift amount of die cutting by using the graduations 74. On the other hand, in the case that the position of die cutting shifts with inclination, it is preferable that graduations 74 are added to cut marks 72 at both ends of each row.

In the above example, label printing device 40 prints the end product image continuing in length corresponding to a desired number of labels, next to the adjusting image. Alternatively, label printing device 40 may print the adjusting image after printing the end product image, in consideration of order of processing of label material in label printing device 40 and die-cutting machine 50. That is, in the printing system 10 having the construction that label material 70 winded in a roll by the rewinder 48c of label printing device 40 is set to the feeder of die-cutting machine 50, the part of label material 70 printed last is die-cut first, and therefore, label printing device 40 should print the adjusting image after printing the end product image. On the other hand, in the printing system 10 having the construction that label material 70 on which print processor 48b of label printing device 40 performed print processing, is not winded and is inserted into die-cutting machine 50; or is winded in a roll by rewinder 48c of label printing device 40, then rewinded in a roll, and set to the feeder of die-cutting machine 50, the part of label material 70 printed first, is die-cut first, and therefore, label printing device 40 should print the end product image after printing the adjusting image.

Figure 12A:
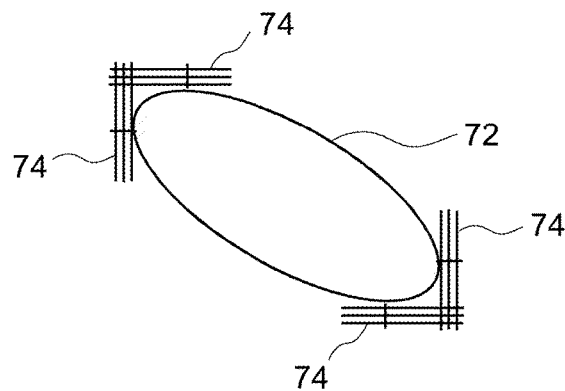
FIGS. 12A to 12C are diagrams illustrating conditions of graduations after a process of die cutting and a process of removing waste.
Figure 12B:
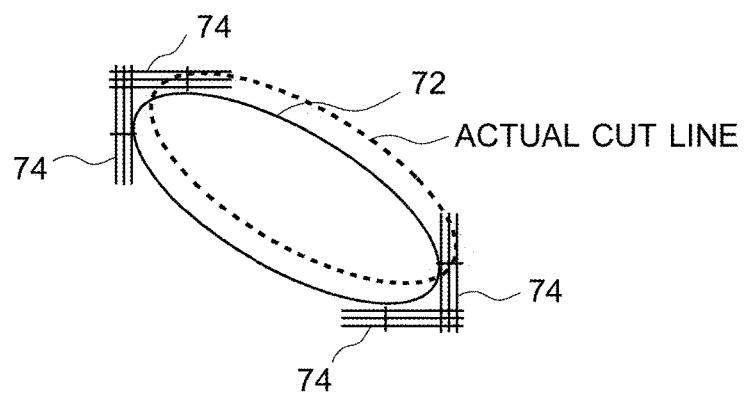
Figure 12C:
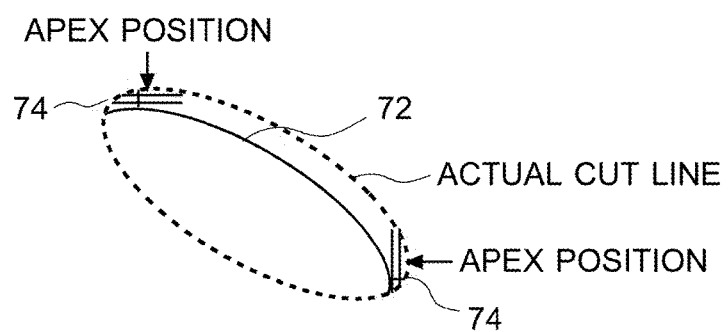

Next, a description is given of appearance of graduations 74 at the time after die cutting and at the time after removing the waste. An example is given by using cut mark 72 with graduations 74 as illustrated in FIG. 12A, on which die cutting is performed by specifying the position of die cutting in the vertical and horizontal directions on the basis of a position sensing mark. In a process of die cutting, it is rare that labels are die-cut at accurate positions from the beginning, and the position adjustment of the die cutting is performed by repeating the processes of performing die cutting, stop the die cutting, measurement of the shift amount of die cutting, inputting the amount of position adjustment of the die cutting, and performing next die cutting. When the line actually cut by a process of die cutting (indicated by a broken line in FIG. 12B) is shifted from cut mark 72 as illustrated in FIG. 12B, a part of graduations 74 which were added around cut mark 72 (in other words, adjacent to each apex of cut mark 72) remains on label 70a left on a release liner as illustrated in FIG. 12C, after the process of removing the waste. Thereby, an operator can easily measure the shift amount of the apex position of the line cut by the process of die cutting, by using the remaining portion of graduations 74 added adjacent to each apex position. By adjusting the position of die cutting in accordance with the number of graduations 74 in the remaining portion, the operator can achieve the exact, corresponding placement of the position of die cutting to the cut mark 72, which allows the operator to complete the position adjustment after a small number of repetitions of the position adjustment.

Figure 13A:
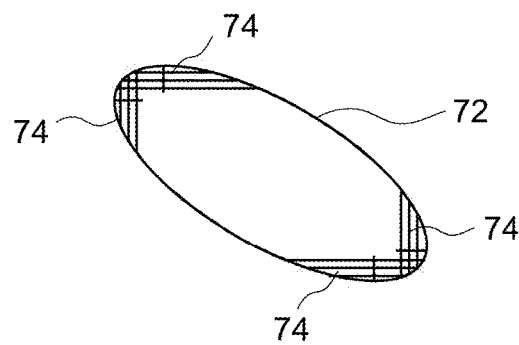
FIGS. 13A to 13C are diagrams illustrating conditions of graduations (added inside a cut mark) after a process of die cutting and a process of removing waste.
Figure 13B:
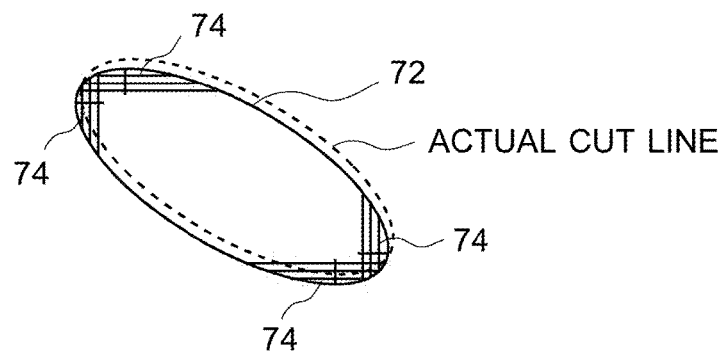
Figure 13C:
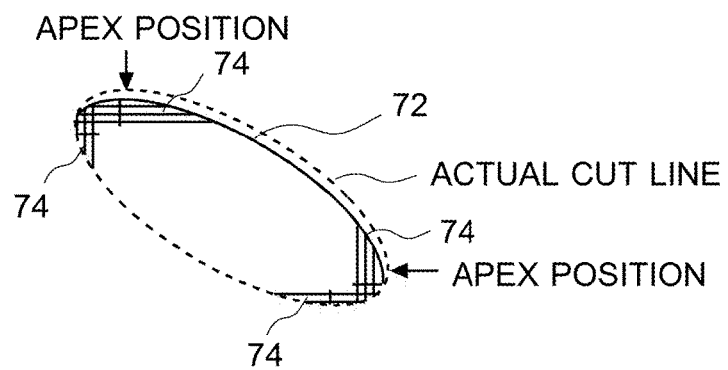

FIGS. 13A to 13C illustrate another example of cut mark 72 with graduations 74 added to the inside. FIG. 13B illustrates cut mark 72 with graduations 74 shown in FIG. 13A, given after the process of die cutting, and FIG. 13C illustrates the cut mark 72 with graduations 74 left after the process of removing the waste. Also in this example, a part of graduations 74 added inside the cut mark 72 remains on label 70a left on a release liner after the process of removing the waste, as illustrated in FIG. 13C. Since the shift amount of the position of die cutting (the shift amount of actual cut line from cut mark 72) depends on the number of graduations 74 left on the waste, an operator is needed to determine the shift amount of the position of die cutting by subtracting the number of graduations 74 added adjacent to each apex position and remaining inside the cut mark 72, from the number of all the graduations 74 added adjacent to the corresponding apex position.

A description is given below of operations of printer controller 30 of the present example. CPU 32 reads out a label printing control program stored in ROM 33 or storage unit 35, loads the program onto RAM 34, and executes the program, thereby performing the processing of the steps illustrated in the flowcharts of FIGS. 14 to 16.

First, controller 31 (cut mark extraction section 31*a*) receives print data including cutting data from client terminal 20 (S100), analyzes the print data to extract objects of cut marks (for example, objects to which a spot color is set) from images contained in the print data (S110).

Next, controller 31 (end product image creation section 31*b*) performs creation of an end product image (S120). FIG. 15 illustrates detailed processing of the creation of an end product image. Controller 31 (end product image creation section 31*b*) picks up one graphic object from the image data and judges whether the graphic object is an object other than a cut mark (in other words, is a label image or a position sensing mark) (S121), and on judging that the graphic object is not a cut mark, renders the graphic object (S122). Successively, controller 31 (end product image creation section 31*b*) judges whether the graphic object concerned is the last one in the image data (S123) and returns to the step S121 to repeat the similar processes until the last object is picked up.

Returning to FIG. 14, controller 31 (adjusting image creation section 31*d*) performs creation of an adjusting image (S130). FIG. 16 illustrates detailed processing of the creation of an adjusting image. Controller 31 (adjusting image creation section 31*d*) picks up one graphic object from the image data and judges whether the graphic object is a cut mark or a position sensing mark (S131), and on judging that the graphic object is a cut mark or a position sensing mark, renders the object (S132). It is preferable that the cut mark is rendered in a single color of black, similarly to a position sensing mark. Successively, controller 31 (adjusting image creation section 31*d*) judges whether the graphic object is a cut mark (S133), and on judging that the graphic object is not a cut mark, controller 31 (adjusting image creation section 31*d*) goes to step S136. On judging that the graphic object is a cut mark, controller 31 (apex finding section 31*c*) finds the positions of apexes of the cut mark by using the method illustrated in FIG. 8 (S134), and renders graduations 74 adjacent to (preferably, on the outside of) each of apexes of the cut mark 72 as illustrated in FIGS. 12A to 12C or FIGS. 13A to 13C (S135). It is preferable that also the graduations 74 are rendered in a single color of black. Then, controller 31 (apex finding section 31*c*) judges whether the graphic object is the last one in the image data (S136) and returns to the step S131 to repeat the similar processes until the last object is picked up.

Returning to FIG. 14 again, controller 31 (print instruction section 31*e*) stores image data of the end product image created in step S120 and image data of the adjusting image created in step S130 into buffer for image transfer 38 and sends the image data to label printing device 40 through engine interface unit 37, to cause label printing device 40 to perform print processing (S140).

As described above, printer controller 30 is configured to performs the following processing. That is, printer controller 30 creates, from print data including cutting data (cut marks), an end product image including label images and optionally a position sensing mark; and an adjusting image including cut marks and optionally a position sensing mark. Printer controller 30 finds apexes of the cut marks and adds graduations adjacent to each of apexes of the cut marks in the adjusting image. Printer controller 30 instructs to label printing device to print the adjusting image with the graduations added and the end product image successively on label material. This processing makes position adjustment of die cutting easy and allows an operator to complete the position adjustment after a reduced number of repetitions of the position adjustment. It results in a reduction of wasteful use of resources and man-hours for label printing. Further, when cut marks and graduations, which are generally created in a spot color, are printed in a single color of black on label material as in the present example, it reduces the consumptions of toner in label printing device 40. Further, it increases visibility of the printed cut marks and graduations, which makes the position adjustment of die cutting easier.

The present invention should not be limited to the above-described embodiments and examples, and the constitution and control may be modified appropriately, unless such modification deviates from the intention of the present invention.

For example, in the above example, the end product image is composed of label images 71 and position sensing marks 73, and the adjusting image is composed of cut marks 72 and position sensing marks 73. The end product image and the adjusting image may further include any other images or components.

The above example shows an example that the end product image and the adjusting image are printed successively on continuous label material provided in a roll form. Alternatively, when a printing system employs a die cutting device that supports sheeted label material, the end product image and the adjusting image may be printed successively on different sheets of label material.

The present invention is applicable to label printing control devices which realize easy position adjustment of die cutting in label printing, label printing control programs to be executed in the label printing control devices, non-transitory computer-readable media each storing the label printing control program, and label printing control methods to be used in a printing system including the label printing control device.

The invention claimed is:

1. A label printing control device which instructs a label printing device to print label images on label material on which the label images are to be cut into labels by a die-cutting machine, the label printing control device comprising:
   an engine interface unit that communicably connects the label printing control device to the label printing device; and
   a hardware processor configured to:
      obtain print data including at least label images and corresponding cut marks each being a shape of a cutting area to be used for cutting the label images printed on label material into labels, and extract the cut marks from the print data as an image to be printed on the label material;
      create an end product image by removing the cut marks from the print data;
      find apexes of the cut marks, each of the apexes being a peak of the shape of the cutting area;
      create an adjusting image including the cut marks with graduations added adjacent to each of the apexes; and output image data of the end product image and the adjusting image to the label printing device and instruct the label printing device to print the end product image and the adjusting image successively on the label material, through the engine interface unit.

2. The label printing control device of claim 1,
wherein the cut marks in the print data are set in a predetermined spot color,
the hardware processor is configured to find objects in the predetermined spot color in the print data, to extract the cut marks, and
the hardware processor is configured to create the adjusting image including the cut marks with the graduations both in a single color of black.

3. The label printing control device of claim 1, wherein
the shape of each of the cut marks is a closed curve,
the hardware processor is configured to find four apexes of each of the cut marks by using a first coordinate axis and a second coordinate axis which are perpendicular to each other on a plane including the cut marks, the four apexes being a point having a maximum first coordinate, a point having a minimum first coordinate, a point having a maximum second coordinate, and a point having a minimum second coordinate, among points on the each of the cut marks, and
the hardware processor is configured to add the graduations adjacent to each of the four apexes, on an outside of each of the cut marks.

4. The label printing control device of claim 1, wherein
the print data further includes a position sensing mark for indicating a position of one or more of the label images on a face of the label material,
the hardware processor is configured to create the end product image including the label images and the position sensing mark, and
the hardware processor is configured to create the adjusting image including the cut marks, the graduations and the position sensing mark.

5. The label printing control device of claim 4, wherein
when the die-cutting machine is configured to perform die cutting on label material in order of print processing on the label material in the label printing device, the print instruction section instructs the label printing device to print the adjusting image before the end product image, and
when the die-cutting machine is configured to perform die cutting on label material in reverse order of print processing on the label material in the label printing device, the print instruction section instructs the label printing device to print the adjusting image after the end product image.

6. A non-transitory computer-readable storage medium storing a label printing control program to be executed in a label printing control device which instructs a label printing device to print label images on label material on which the label images are to be cut into labels by a die-cutting machine, the program, when being executed, causing a controller of the label printing control device to perform processing comprising:
obtaining print data including at least label images and corresponding cut marks each being a shape of a cutting area to be used for cutting the label images printed on label material into labels;
extracting the cut marks from the print data as an image to be printed on the label material;
creating an end product image by removing the cut marks from the print data;
finding apexes of the cut marks, each of the apexes being a peak of the shape of the cutting area;
creating an adjusting image by adding graduations adjacent to each of the apexes of the cut marks extracted;
outputting image data of the end product image and the adjusting image to the label printing device; and
instructing the label printing device to print the end product image and the adjusting image successively on the label material.

7. The non-transitory computer-readable storage medium of claim 6, wherein
the cut marks in the print data are set in a predetermined spot color,
the extracting cut marks includes finding objects in the predetermined spot color in the print data, and
the creating the adjusting image includes creating the adjusting image including the cut marks with the graduations both in a single color of black.

8. The non-transitory computer-readable storage medium of claim 6, wherein
the shape of each of the cut marks is a closed curve,
the finding apexes of the cut marks includes finding four apexes of each of the cut marks by using a first coordinate axis and a second coordinate axis which are perpendicular to each other on a plane including the cut marks, the four apexes being a point having a maximum first coordinate, a point having a minimum first coordinate, a point having a maximum second coordinate, and a point having a minimum second coordinate, among points on the each of the cut marks, and
the creating the adjusting image includes adding the graduations adjacent to each of the four apexes, on an outside of each of the cut marks.

9. The non-transitory computer-readable storage medium of claim 6, wherein
the print data further includes a position sensing mark for indicating a position of one or more of the label images on a face of the label material,
the creating the end product image includes creating the end product image including the label images and the position sensing mark, and
the creating the adjusting image includes creating the adjusting image including the cut marks, the graduations and the position sensing mark.

10. The non-transitory computer-readable storage medium of claim 9,
wherein the instructing the label printing device includes,
when the die-cutting machine is configured to perform die cutting on label material in order of print processing on the label material in the label printing device, instructing the label printing device to print the adjusting image before the end product image, and
when the die-cutting machine is configured to perform die cutting on label material in reverse order of print processing on the label material in the label printing device, instructing the label printing device to print the adjusting image after the end product image.

11. A label printing control method for use in a printing system including a label printing device, a die-cutting machine which performs die cutting on label material on which label images were printed by the label printing device, and a label printing control device which instructs the label printing device to perform print processing on label material, the method comprising:

obtaining, by the label printing control device, print data including at least label images and corresponding cut marks each being a shape of a cutting area to be used for cutting the label images printed on label material into labels;

extracting, by the label printing control device, the cut marks from the print data as an image to be printed on the label material;

creating, by the label printing control device, an end product image by removing the cut marks from the print data;

finding apexes of the cut marks, by the label printing control device, each of the apexes being a peak of the shape of the cutting area;

creating, by the label printing control device, an adjusting image by adding graduations adjacent to each of the apexes of the cut marks extracted;

outputting, by the label printing control device, image data of the end product image and the adjusting image to the label printing device; and instructing the label printing device to print the end product image and the adjusting image successively on the label material, by the label printing control device.

12. The label printing control method of claim 11, wherein the cut marks in the print data are set in a predetermined spot color, the extracting cut marks includes finding objects in the predetermined spot color in the print data, and the creating the adjusting image includes creating the adjusting image including the cut marks with the graduations both in a single color of black.

13. The label printing control method of claim 11, wherein the shape of each of the cut marks is a closed curve, the finding apexes of the cut marks includes finding four apexes of each of the cut marks by using a first coordinate axis and a second coordinate axis which are perpendicular to each other on a plane including the cut marks, the four apexes being a point having a maximum first coordinate, a point having a minimum first coordinate, a point having a maximum second coordinate, and a point having a minimum second coordinate, among points on the each of the cut marks, and the creating the adjusting image includes adding the graduations adjacent to each of the four apexes, on an outside of each of the cut marks.

14. The label printing control method of claim 11, wherein the print data further includes a position sensing mark for indicating a position of one or more of the label images on a face of the label material, the creating the end product image includes creating the end product image including the label images and the position sensing mark, and the creating the adjusting image includes creating the adjusting image including the cut marks, the graduations and the position sensing mark.

15. The label printing control method of claim 14, wherein the instructing the label printing device includes, when the die-cutting machine is configured to perform die cutting on label material in order of print processing on the label material in the label printing device, instructing the label printing device to print the adjusting image before the end product image, and when the die-cutting machine is configured to perform die cutting on label material in reverse order of print processing on the label material in the label printing device, instructing the label printing device to print the adjusting image after the end product image.

16. A label printing control device which instructs a label printing device to print label images on label material on which the label images are to be cut into labels by a die-cutting machine, the label printing control device comprising:

an engine interface unit that communicably connects the label printing control device to the label printing device; and a hardware processor configured to:
    obtain print data including at least label images and corresponding cut marks each being a shape of a cutting area to be used for cutting the label images printed on label material into labels, and extract the cut marks from the print data as an image to be printed on the label material;
    create an end product image by removing the cut marks from the print data;
    find apexes of the cut marks, each of the apexes being a peak of the shape of the cutting area;
    create an adjusting image including a graduation image including graduations located adjacent to each of the apexes; and
    output image data of the end product image and the adjusting image to the label printing device and instruct the label printing device to print the end product image and the adjusting image successively on the label material, through the engine interface unit.

* * * * *